United States Patent

Simons et al.

(10) Patent No.: US 6,754,423 B2
(45) Date of Patent: Jun. 22, 2004

(54) SINGLE MODE OPTICAL FIBRE, AND METHOD FOR THE MANUFACTURE OF A SINGLE MODE OPTICAL FIBRE

(75) Inventors: Dennis Robert Simons, Eindhoven (NL); Antonius Henricus Elisabeth Breuls, Urmond (NL)

(73) Assignee: Draka Fibre Technology B.V., Eindhoven (NL)

( * ) Notice: Subject to any disclaimer, the term of this patent is extended or adjusted under 35 U.S.C. 154(b) by 21 days.

(21) Appl. No.: 09/876,018

(22) Filed: Jun. 8, 2001

(65) Prior Publication Data

US 2002/0015570 A1 Feb. 7, 2002

(30) Foreign Application Priority Data

Jun. 9, 2000 (NL) ............................................. 1015405

(51) Int. Cl.[7] ................................................. G02B 6/02
(52) U.S. Cl. ........................ 385/126; 385/127; 385/128
(58) Field of Search ................................. 385/126, 127, 385/128; 65/3.11, 3.12; 427/39

(56) References Cited

U.S. PATENT DOCUMENTS

| | | | |
|---|---|---|---|
| 4,468,413 A | | 8/1984 | Bachmann .................... 427/39 |
| 4,691,991 A | * | 9/1987 | Unger .......................... 385/127 |
| 4,802,733 A | | 2/1989 | Bachmann et al. ....... 350/96.34 |
| 5,033,815 A | | 7/1991 | Edahiro et al. ........... 350/96.34 |
| 5,090,979 A | | 2/1992 | Sergent et al. ................ 65/3.12 |
| 5,242,476 A | | 9/1993 | Bartel et al. .................. 65/3.11 |
| 5,790,736 A | | 8/1998 | Fabian ......................... 385/128 |
| 5,895,515 A | * | 4/1999 | Ishikawa et al. ............... 65/377 |
| 5,995,695 A | * | 11/1999 | Aikawa et al. .............. 385/123 |
| 6,020,224 A | * | 2/2000 | Shimogaichi et al. ........ 438/158 |
| 6,201,917 B1 | * | 3/2001 | Campion et al. ............ 385/123 |

FOREIGN PATENT DOCUMENTS

| | | |
|---|---|---|
| EP | 0 434 237 | 6/1991 |
| EP | 0 477 435 | 4/1992 |
| EP | 0 762 159 | 3/1997 |
| EP | 0 887 670 | 12/1998 |

\* cited by examiner

*Primary Examiner*—Drew Dunn
*Assistant Examiner*—Joshua L Pritchett
(74) *Attorney, Agent, or Firm*—Oblon, Spivak, McClelland, Maier & Neustadt, P.C.

(57) ABSTRACT

The present invention relates to a method for the manufacture of a single mode optical fibre comprising a light-conductive core portion, an internal cladding portion surrounding said core portion and a jacketing portion surrounding said internal cladding portion, in which the refractive index of the core portion is larger than those of the cladding and jacketing portion areas, and in which the refractive indices of the cladding and jacketing portion areas are practically equal.

27 Claims, 2 Drawing Sheets

SINGLE MODE OPTICAL FIBRE, AND METHOD FOR THE MANUFACTURE OF A SINGLE MODE OPTICAL FIBRE

The present invention relates to a method for the manufacture of a single mode optical fibre comprising a light-conductive core portion, an internal cladding portion surrounding said core portion and a jacketing portion surrounding said internal cladding portion, in which the refractive index of the core portion is larger than those of the cladding and jacketing portion areas, and in which the refractive indices of the cladding and jacketing portion areas are practically equal, by which method a silica substrate tube used as jacketing portion, is internally flushed with one or more reactive gases to form the internal cladding portion and core portion, respectively, after which the substrate tube thus provided with layers is collapsed and drawn into a single mode optical fibre. Furthermore, the present invention relates to a single mode optical fibre comprising a light-conductive core portion, a cladding portion surrounding said core portion and a jacketing portion surrounding said internal cladding portion.

Optical fibres of this type are well known and are mainly applied in the field of telecommunications technology. See, for example, European Patent Application 0 127 227, U.S. Pat. No. 5,242,476 and U.S. Pat. No. 5,838,866. The term 'single mode' used in the present description is generally known to experts in this field and needs therefore no further explanation here. Because of their characteristic low attenuation and dispersion such optical fibres are particularly suitable for the formation of long-distance data links, often spanning many thousands of kilometers. Over such considerable distances it is of vital importance that the cumulative signal losses in the optical fibre be kept to a minimum, if transmission of optical signals is to occur with a small number of intermediate amplification stations. At the commonly employed transmission wavelength of 1550 nm the telecommunications industry conventionally requires that the total attenuation in such optical fibres does rot exceed 0.25 dB/km, and preferably does not exceed 0.2 dB/km.

Although the presently manufactured fibres may meet all such requirements with regard to permissible attenuation, it is nevertheless often observed that, after elapse of time, the same optical fibres demonstrate considerable attenuation increases, Extensive investigation has shown that this phenomenon is attributable to the gradual seepage of hydrogen gas into the fibre from its surroundings, with the consequent formation of groups like SiH and SiOH within the fibre. These compounds demonstrate strong infra-red absorption, with attenuation peaks at wavelengths of about 1530 and 1385 nm.

A solution to overcome the problem of such hydrogen-induced attenuation is known from European Patent Application 0 477 435. In the method therein disclosed, a molten optical fibre is extensively exposed to a hydrogen-containing gas during its manufacture, so as to ensure that all structural defect sites in the fibre have already been presented with a hydrogen atom before the actual implementation of the fibre. A disadvantage of this known method is, however, that it only addresses the symptoms of hydrogen-induced attenuation and not the causes thereof. Moreover, this known measure considerably complicates the manufacturing process, and introduces an additional risk of contamination of the product fibre by the hydrogen-containing gas employed.

From U.S. Pat. No. 5,090,979 a method for the manufacture of an optical fibre is known, subsequently comprising of a pure silicon dioxide core portion, an outer layer of fluorine-doped silicon dioxide, a substrate layer of fluorine-doped silicon dioxide, and a carrier layer of pure silicon dioxide, in which the refractive index of the core portion is practically equal to that of the carrier layer.

From U.S. Pat. No. 5,033,815 an optical fibre of the multi-mode type is known, which fibre substantially differs from the present single mode optical fibre. Furthermore, the multi, mode optical fibre known from said publication subsequently contains a $GeO_2$- or $Sb_2O_2$-doped core portion, an F-doped cladding portion and finally a possibly $TiO_2$-doped jacketing portion, resulting in the refractive index of the core portion being higher than those of the cladding- and jacketing portion areas, and the refractive index of the jacketing portion being substantially lower than that of the cladding portion, which refractive index profile substantially differs from the present profile. No data with regard to compressive axial stress are known from said publication.

From European Patent Application 0 762 159 a dispersion-compensating fibre is known, subsequently comprising a core portion with at least 10 mol % of $GeO_2$ and a cladding portion, which cladding portion comprises a first fluorine-doped cladding portion, a second chlorine-doped cladding portion, and a third chlorine- or fluorine-doped cladding portion. The doping of the third cladding portion is chosen such that the glass viscosity at the moment of drawing is lower than that of pure silicon dioxide glass, which allows a relatively low temperature during drawing. No data with regard to compressive axial stress are known from this application.

It is therefore an objective of the present invention to provide a method for the manufacture of a single mode optical fibre, in which the hydrogen-induced attenuation at a wavelength of 1550 nm is sufficiently low to ensure the total attenuation at that wavelength to be at most 0.25 dB/km, and preferably to be at most 0.2 dB/km.

As mentioned in the preamble, in accordance with the present invention this objective is achieved because the present method for the manufacture of a single mode optical fibre is characterised in that the internal cladding portion is built up from $SiO_2$ comprising a fluorine doping within a range of 0.1–8.5 wt. %, thus resulting in the core portion to be subjected to a compressive axial stress over its full cross section.

The present inventors suppose that the presence of axial compression in the fibre core prevents the occurrence of the defects mentioned before, thus resulting in a significantly lowered hydrogen-induced attenuation. Since, according to the present inventors, the presence of axial tension in a fibre core facilitates the formation of structural defects in the silicon dioxide core, the presence of axial compression in a fibre core will essentially inhibit the occurrence of such defects, thus leading to a substantially lowered hydrogen-induced attenuation.

The present inventors have carried out a number of experiments in which a preform was manufactured by subsequently providing the internal surface of a substrate tube with an internal cladding portion of silicon oxide, which cladding portion is built up of $SiO_2$, comprising fluorine-doping, and a second doped layer of silicon oxide, which second layer has a higher refractive index than that of the internal cladding portion and forms the final core of the fibre. The substrate tube thus provided with a core portion and internal cladding portion was subsequently thermally subjected to a collapse procedure to form a rod, which rod eventually was drawn into the required fibres at one of its molten extremities.

In the present invention the internal cladding portion is preferably doped with fluorine within a range of 0.1–8.5 wt. %, and preferably of 0.2–2.0 wt. %. Fluorine-doping of more than 8.5 wt. % is undesirable since then problems will arise in the deposition of such layers. A fluorine amount of less than 0.1 wt. % does not give a noticeable result with regard to the required compressive axial stress in the core portion. A maximum doping of 2.0 wt. % is particularly preferred if very low attenuation losses are required, which attenuation losses are negatively influenced by the increase of Rayleigh scattering. The fact is that experiments have shown that part of the internal cladding portion also functions as a light path for the light that is transported inside the fibre's core.

The application of fluorine doping in the internal cladding portion results in a decrease of the refractive index of this layer. In order to adjust the thus lowered refractive index, which refractive index preferably is practically equal to that of the jacketing portion area, the internal cladding portion is provided with so-called refraction-increasing doping materials, like, for instance, $P_2O_5$, $TiO_2$, $ZrO_2$, $SnO_2$, $GeO_2$, N or $Al_2O_3$, or a combination of one or more of such compounds.

In certain embodiments of the present method it is particularly preferred to insert a buffer layer between the jacketing portion and the internal cladding portion, which buffer layer has a refractive index that is lower than that of the core portion and is practically equal to that of the cladding portion and jacketing portion areas.

Such a buffer layer is particularly required if the optical quality of the jacketing portion is low, which means that the jacketing portion contains impurities. In the successive heat treatments for the collapse for manufacturing the preform and the subsequent drawing of fibres from the preform, such impurities may diffuse to the light-conductive part of the optical fibre, as a result of which a heightened attenuation occurs. The application of a buffer layer therefore prevents the impurities to end up in the light-conductive part of the fibre.

In a special embodiment of the present method it is also preferred to insert an intermediate layer between the core portion and the internal cladding portion, which intermediate layer has a refractive index that is lower than that of the core portion and is practically equal to that of the internal cladding and jacketing portion areas.

The light conduction in the single mode optical fibre partially occurs in the layer directly surrounding the core portion. If this layer is heavily doped, effects of increased Rayleigh scattering are noticeable, leading to an attenuation increase. However, high doping may be required to bring the core portion, under the required compressive axial stress. Thus an intermediate layer with low doping is preferably inserted to prevent possible negative effects of extra Rayleigh scattering.

The internal cladding portion preferably has a thickness 3–21 micrometers in the final fibre.

The required layer thickness depends on the dopings in the layer. Tests have shown that a layer thickness of less than 3 micrometers is insufficient to bring the core portion under the required compressive axial stress, which is required in accordance with the present invention. The upper limit of the maximum layer thickness for the internal cladding portion is mainly determined by the processability of the preform that is eventually drawn into an optical fibre.

In a certain embodiment it is furthermore required that the light-conductive core portion provided with one or more dopings is built up of $SiO_2$, comprising a fluorine doping within a range of 0.2–2 wt. % and one or more dopings that ensure the core portion to possess the refractive index required in accordance with the present invention, which core refractive index is higher than that of the cladding portion, which dopings, for instance, may comprise $P_2O_5$, $TiO_2$, $ZrO_2$, $SnO_2$, $GeO_2$, N and $Al_2O_3$ or a combination of one or more of these compounds.

In a special embodiment it is preferred that the preform, comprising the core portion, internal cladding portion and jacketing portion, possibly supplemented with a buffer and/or intermediate layer, at the outer surface of the jacketing portion is provided with an additional layer, for instance in the form of a glass tube or a layer applied by means of an external CVD procedure.

In accordance with the present invention the formation of the core portion and internal cladding portion, and possibly the intermediate and/or buffer layer mentioned before, is carried out by means of a chemical vapour deposition procedure, in particular with a PCVD procedure, preferably plasma-induced. Since the axial length of a conventional substrate tube in particular is many times larger than its diameter, a controlled deposition of a uniform layer of material onto the internal surface of such a substrate tube is very hard to achieve with the conventional deposition procedures like sputter deposition or laser ablation deposition. In the PCVD embodiment the applied chemical vapour can successfully be distributed over the full length of the internal surface of the substrate tube, thus enabling a very uniform deposition onto the internal wall. Moreover, by applying the PCVD procedure it is possible to carry out a deposition of layers with controlled doping levels, thus enabling this procedure to be used successfully for the deposition of the core portion and internal cladding portions possibly supplemented with the intermediate and/or buffer layers.

The present invention further relates to a single mode optical fibre comprising a light-conductive core portion, an internal cladding portion surrounding said core portion and a jacketing portion surrounding said internal cladding portion, in which the refractive index of the core portion is larger than that of the internal cladding portion and jacketing portion areas, and in which the refractive indices of the internal cladding portion and jacketing portion areas are practically equal, which single mode optical fibre in accordance with the present invention is characterised in that the internal cladding portion is built up of $SiO_2$ comprising a fluorine doping within a range of 0.1–8.5 wt. %, preferably of 0.2–2.0 wt. %, resulting in the core portion being subjected to a compressive axial stress over its full cross section.

In a special embodiment it is further preferred that the single mode optical fibre is built up in such a way that between the core portion and the internal cladding portion an intermediate layer is inserted, which intermediate layer has a refractive index that is lower than that of the core portion and is practically equal to those of the internal cladding portion and jacketing portion areas.

Moreover, in a special embodiment of the present single mode optical fibre it is preferred that there is a buffer layer between the jacketing portion and the internal cladding portion, which buffer layer has a refractive index that is lower than that of the core portion and is practically equal to those of the internal cladding portion and jacketing portion areas.

Furthermore, in certain embodiments it is preferred that there is an external cladding portion on the outside of the jacketing portion.

Below, the present invention is illustrated by means of a number of drawings, which drawings only serve an illustrated purpose and do not form any limitation to the scope of protection of the present invention.

Figure 1:
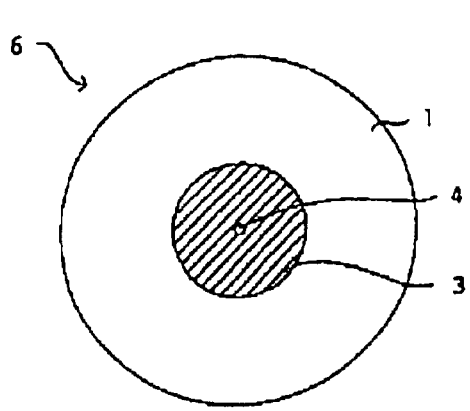
FIG. 1 represents an embodiment of a single mode optical fibre in accordance with the present invention.
Figure 4:
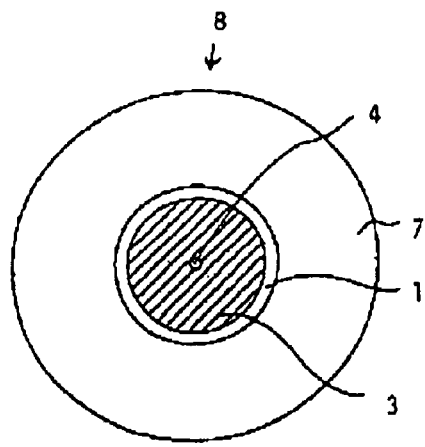
Figure 2:
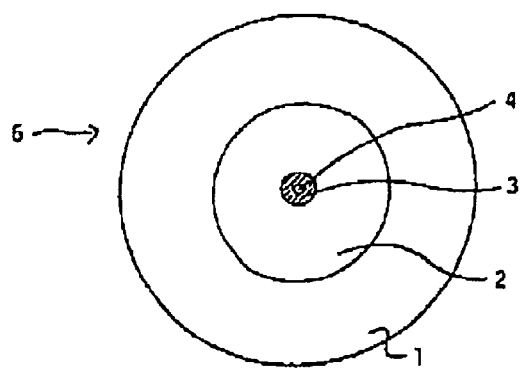
FIG. 2 represents a special embodiment of a single model optical fibre in accordance with the present invention, in which a buffer layer has been placed.
Figure 5:
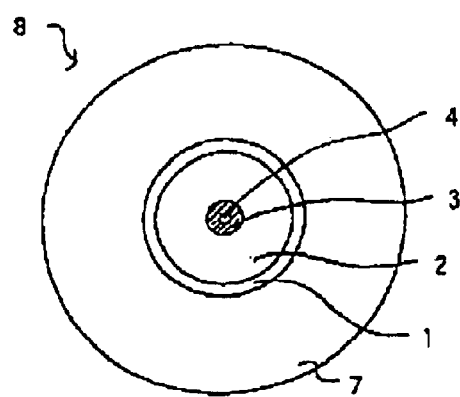
Figure 3:
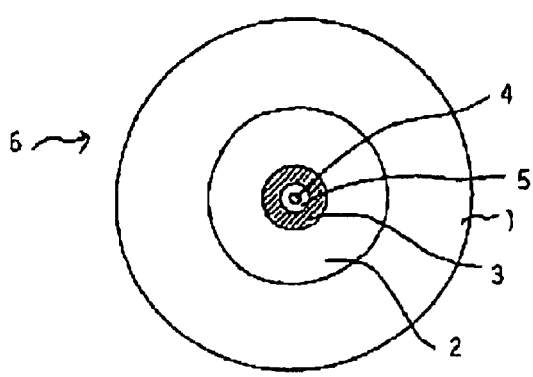
FIG. 3 represents a special embodiment of a single model optical fibre in accordance with the present invention, in which an intermediate layer has been placed.
Figure 6:
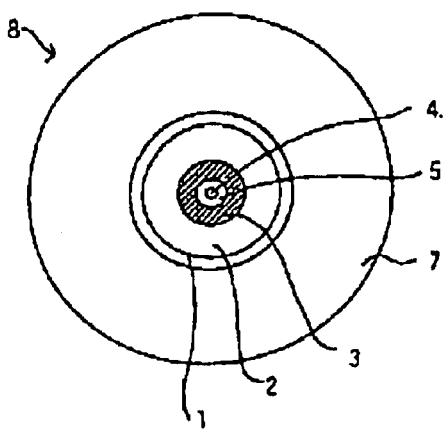

FIGS. 4–6 correspond to the respective FIGS. 1–3, in which the jacketing portion, however, has been provided with an external cladding portion.

Figure 7:
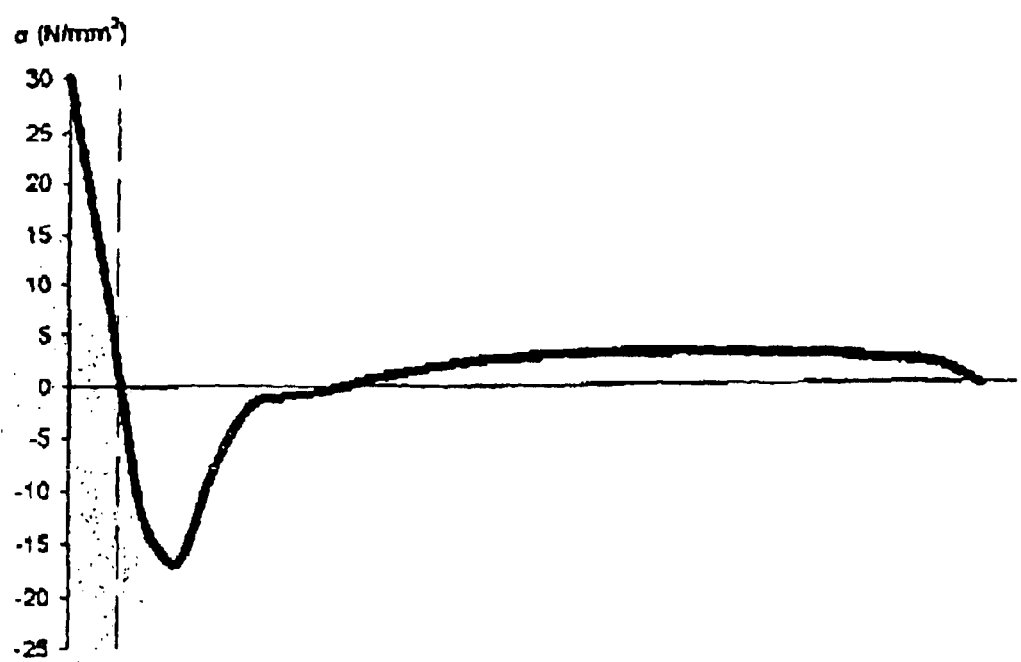

FIG. 7 represents a graph of tension vs. fibre radius in accordance with the state of the art.

Figure 8:
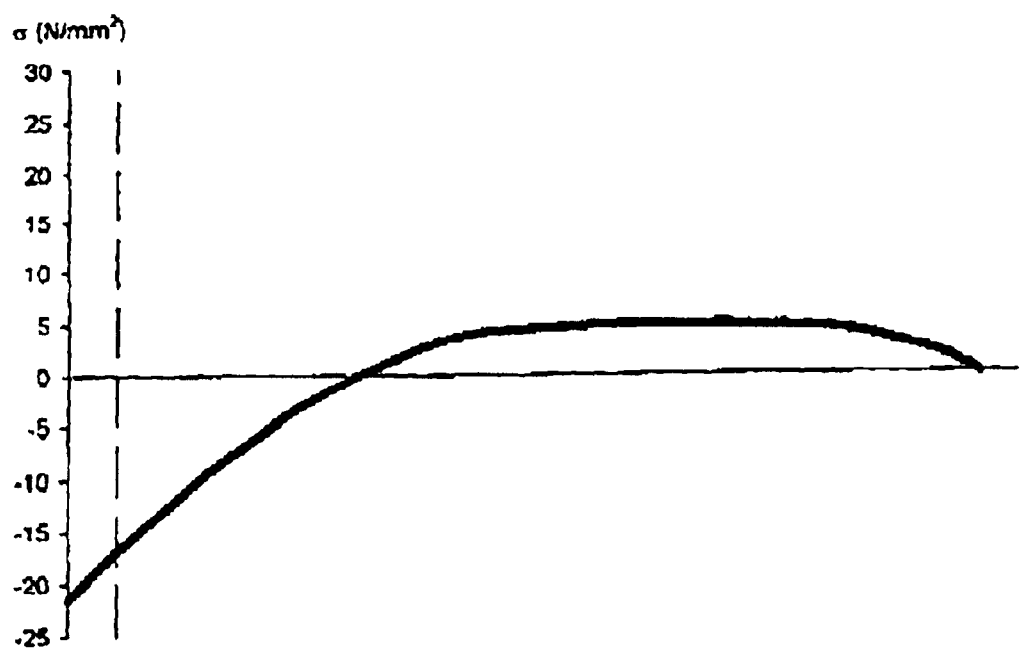

FIG. 8 represents a graph of tension vs. fibre radius in accordance with the present invention.

In FIG. 1 a single mode optical fibre 6 is schematically represented, which optical fibre 6 has been obtained after collapsing a preform and the drawing from it of a fibre. The single mode optical fibre 6 can been regarded as a light-conductive core portion 4, which light-conductive core portion 4 is surrounded by an internal cladding portion 3, in which the internal cladding portion 3 is subsequently surrounded by a jacketing portion 1. A substrate tube is, for instance, suitable as jacketing portion. The refractive index of the core portion 4 is larger than the refractive indices of the internal cladding portion 3 and the jacketing portion 1, in which the refractive indices of the last two portions are practically equal. It should be mentioned that the same reference numbers used in FIGS. 1–6 correspond with one another.

In FIG. 2 a special embodiment of the single mode optical fibre 6 is schematically represented, which single mode optical fibre 6 comprises a light-conductive core portion 4, which light-conductive core portion 4 is surrounded by an internal cladding portion 3, which internal cladding portion 3 is surrounded by a buffer layer 2, which buffer layer 2, finally, is surrounded by a jacketing portion 1. Such a single mode optical fibre 6 is manufactured in accordance with the present method by using a silica substrate tube as jacketing portion 1, after which buffer layer 2, internal cladding portion 3 and finally core portion 4, respectively, are deposited by means of a PCVD procedure. When the aforementioned layers have been deposited onto the silica substrate tube, a thermal collapse procedure is carried out after which a preform is obtained from which in the end the single mode optical fibre 6 is drawn.

In FIG. 3 a special embodiment of the single mode optical fibre 6 is schematically represented, which single mode optical fibre 6 comprises a core portion 4 surrounded by an intermediate layer 5, which intermediate layer 5 is surrounded by an internal cladding portion 3, which internal cladding portion 3 is surrounded by a buffer layer 2, which buffer layer 2, finally, is surrounded by a jacketing portion 1. The single mode optical fibre 6 schematically represented in FIG. 3 is manufactured in the same manner as is described in FIG. 2. In certain embodiments it is, however, also possible to omit the buffer layer 2 shown in FIG. 3, resulting in the internal cladding portion 3 to be directly deposited onto the jacketing portion 1, followed by intermediate layer 5 and finally core portion 4. However, this embodiment is not schematically represented.

In FIG. 4 the jacketing layer 1 is provided with an external cladding portion 7, which also applies in FIGS. 5 and 6. The present invention should especially be seen in the subjection of the core portion of a single mode optical fibre to compressive axial stress by doping the internal cladding portion with fluorine in a range of 0.1–8.5 wt. %, and preferably of 0.2–2.0 wt %.

In FIG. 7 a graph is shown of the stress (as function of the radius r of a single mode optical fibre in accordance with the state of the art, which fibre is composed of a core portion built up of $SiO_2$ doped with $GeO_2$ and F, and an undoped cladding portion composed of $SiO_2$. The position of the core portion is indicated by a vertical dotted line, and is thus it is immediately clear that the core portion is under a positive stress, namely a tensile stress.

In FIG. 8 a graph is shown of the stress (as function of the radius r of a single mode optical fibre in accordance with the present invention, which fibre is composed of a core portion built up of $SiO_2$ doped with $GeO_2$ and F, and further an internal cladding portion, which is built up of $SiO_2$ doped with F and $GeO_2$ in accordance with FIG. 5, possesses, in which the remaining areas consist of undoped $SiO_2$. The position of the core portion is also indicated by a vertical dotted line, and it is immediately noticeable that the core portion is under an compressive axial stress, which is required in accordance with the present invention.

What is claimed is:

1. A single mode optical fibre comprising:
   a light-conductive core portion,
   an internal cladding portion surrounding this core portion, and
   a jacketing portion surrounding this internal cladding portion, in which the refractive index of the core portion is larger than those of the cladding portion and jacketing portion areas and in which the refractive indices of the cladding portion and jacketing portion areas are practically equal,
   wherein the internal cladding portion is built up of $SiO_2$ comprising a fluorine doping within a range of 0.1–8.5 wt. %, thus resulting in the core portion to be subjected to a compressive axial stress over its full cross section.

2. A single mode optical fibre according to claim 1, wherein the amount of fluorine in the internal cladding portion (3) lies within the range of 0.2–2.0 wt. %.

3. A single mode optical fibre according to claim 1, further comprising a buffer layer between the jacketing portion and the internal cladding portion, which buffer layer has a refractive index that is lower than that of the core portion and is practically equal to those of the internal cladding portion and jacketing portion areas.

4. A single mode optical fibre according to claim 1, further comprising an intermediate layer between the core portion and the internal cladding portion, which intermediate layer has a refractive index that is lower than that of the core portion and is practically equal to those of the internal cladding portion and jacketing portion areas.

5. A single mode optical fibre according to claim 1, further comprising an external cladding portion on the outside of the jacketing portion, which external cladding portion has a refractive index that is practically equal to those of the internal cladding portion and jacketing portion areas.

6. A single mode optical fibre according to claim 1, wherein the internal cladding portion has a thickness that lies within the range of 3–21 μm.

7. A single mode optical fibre according to claim 1, wherein the core portion is built up of $SiO_2$ comprising fluorine doping within a range of 0.2–2.0 wt. %.

8. A method for the manufacture of a single mode optical fibre, comprising a light-conductive core portion, an internal cladding portion surrounding this core portion and a jacketing portion surrounding this internal cladding portion, in which the refractive index of the core portion is larger than those of the internal cladding portion and jacketing portion areas, and in which the refractive indices of the internal cladding portion and jacketing portion areas are practically equal, according to which method a silica substrate tube, functioning as jacketing portion, is being flushed with one or more reactive gases to form the internal cladding portion and the core portion, respectively, after which the substrate tube is collapsed and is drawn into a single mode optical fibre, characterised in that the internal cladding portion is built up of $SiO_2$ comprising of fluorine doping within a range of 0.1–8.5 wt. %, thus resulting in the core portion to be subjected to a compressive axial stress over its full cross section.

9. A method according to claim 8, wherein the amount of fluorine in the internal cladding portion lies within the range of 0.2–2.0 wt. %.

10. A method according to claim 8, wherein a buffer layer is inserted between the jacketing portion and the internal cladding portion, which buffer layer has a refractive index that is lower than that of the core portion and is practically equal to those of the internal cladding portion and jacketing portion areas.

11. A method according to claim 8, wherein an intermediate layer is inserted between the core portion and the internal cladding portion, which intermediate layer has a refractive index that is lower than that of the core portion and is practically equal to those of the internal cladding portion and jacketing portion areas.

12. A method according to claim 8, wherein on the outside of the jacketing portion an external cladding portion is placed, which external cladding portion has a refractive index that is practically equal to those of the internal cladding portion and jacketing portion areas.

13. A method according to claim 8, that wherein the formation of the core portion, and the internal cladding portion, and possibly of the external cladding portion, the intermediate layer and/or buffer layer, is carried out by a PCVD procedure.

14. A method according to claim 13, wherein the PCVD procedure is carried out under plasma induction.

15. A single mode optical fibre comprising:
 a light-conductive core portion,
 an internal cladding portion surrounding this core portion, and
 a jacketing portion surrounding this internal cladding portion, in which the refractive index of the core portion is larger than those of the cladding portion and jacketing portion areas and in which the refractive indices of the cladding portion and jacketing portion areas are practically equal,
 wherein the internal cladding portion is built up of $SiO_2$ comprising a fluorine doping within a range of 0.1–8.5 wt. %, thus resulting in the core portion to be subjected to a compressive axial stress over its full cross section, and characterised in that the attenuation loss of the fibre is at most 0.25 dB/km at 1550 nm.

16. A single mode optical fibre according to claim 15, wherein the amount of fluorine in the internal cladding portion lies within the range of 0.2–2.0 wt. %.

17. A single mode optical fibre according to claim 15, further comprising a buffer layer between the jacketing portion and the internal cladding portion, which buffer layer has a refractive index that is lower than that of the core portion and is practically equal to those of the internal cladding portion and jacketing portion areas.

18. A single mode optical fibre according to claim 15, further comprising an intermediate layer between the core portion and the internal cladding portion, which intermediate layer has a refractive index that is lower than that of the core portion and is practically equal to those of the internal cladding portion and jacketing portion areas.

19. A single mode optical fibre according to claim 15, further comprising an external cladding portion on the outside of the jacketing portion, which external cladding portion has a refractive index that is practically equal to those of the internal cladding portion and jacketing portion areas.

20. A single mode optical fibre according to claim 15, wherein the internal cladding portion has a thickness that lies within the range of 3–21 $\mu$m.

21. A method for the manufacture of a single mode optical fibre, comprising a light-conductive core portion, an internal cladding portion surrounding this core portion and a jacketing portion surrounding this internal cladding portion, in which the refractive index of the core portion is larger than those of the internal cladding portion and jacketing portion areas, and in which the refractive indices of the internal cladding portion and jacketing portion areas are practically equal, according to which method a silica substrate tube, functioning as jacketing portion, is being flushed with one or more reactive gases to form the internal cladding portion and the core portion, respectively, after which the substrate tube is collapsed and is drawn into a single mode optical fibre, characterised in that the internal cladding portion is built up of $SiO_2$ comprising of fluorine doping within a range of 0.1–8.5 wt. %, thus resulting in the core portion to be subjected to a compressive axial stress over its full cross section, and characterised in that the attenuation loss of the fibre is at most 0.25 dB/km at 1550 nm.

22. A method according to claim 21, wherein the amount of fluorine in the internal cladding portion lies within the range of 0.2–2.0 wt. %.

23. A method according to claim 21, wherein a buffer layer is inserted between the jacketing portion and the internal cladding portion, which buffer layer has a refractive index that is lower than that of the core portion and is practically equal to those of the internal cladding portion and jacketing portion areas.

24. A method according to claim 22, wherein an intermediate layer is inserted between the core portion and the internal cladding portion, which intermediate layer has a refractive index that is lower than that of the core portion and is practically equal to those of the internal cladding portion and jacketing portion areas.

25. A method according to claim 21, wherein on the outside of the jacketing portion an external cladding portion is placed, which external cladding portion has a refractive index that is practically equal to those of the internal cladding portion and jacketing portion areas.

26. A method according to claim 21, wherein the formation of the core portion, and the internal cladding portion, and possibly of the external cladding portion, the intermediate layer and/or buffer layer, is carried out by means of a PCVD procedure.

27. A method according to claim 26, wherein the PCVD procedure is carried out under plasma induction.

* * * * *